United States Patent
Rebholz

(10) Patent No.: US 7,445,068 B2
(45) Date of Patent: Nov. 4, 2008

(54) AXLE OF A VEHICLE, ESPECIALLY OF A UTILITY VEHICLE

(75) Inventor: Wolfgang Rebholz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 470 days.

(21) Appl. No.: 10/557,438

(22) PCT Filed: May 8, 2004

(86) PCT No.: PCT/EP2004/004940

§ 371 (c)(1),
(2), (4) Date: Nov. 18, 2005

(87) PCT Pub. No.: WO2004/108461

PCT Pub. Date: Dec. 16, 2004

(65) Prior Publication Data

US 2007/0012504 A1   Jan. 18, 2007

(30) Foreign Application Priority Data

Jun. 4, 2003   (DE) ............................... 103 25 221

(51) Int. Cl.
*B60K 17/16*   (2006.01)
*B60W 10/02*   (2006.01)
*F16D 7/02*    (2006.01)
*F16D 43/20*   (2006.01)

(52) U.S. Cl. .................. 180/76; 192/56.1; 477/166

(58) Field of Classification Search .............. 180/76, 180/383, 338, 197; 192/56.1, 56.2–56.43, 192/56.6–56.62; 475/231, 249; 477/35, 477/166

See application file for complete search history.

(56) References Cited

U.S. PATENT DOCUMENTS

| | | | | |
|---|---|---|---|---|
| 1,704,803 A | * | 3/1929 | Mlinko | 475/228 |
| 1,862,888 A | * | 6/1932 | Eilersaard | 464/30 |
| 2,012,087 A | * | 8/1935 | Nardone | 192/48.7 |
| 2,226,759 A | * | 12/1940 | Fitzner | 180/76 |
| 2,510,667 A | * | 6/1950 | Starkey | 192/56.2 |
| 2,544,809 A | * | 3/1951 | Stanley | 192/48.91 |
| 2,750,020 A | * | 6/1956 | Rice et al. | 192/56.43 |
| 4,154,487 A | * | 5/1979 | Vannini et al. | 303/154 |
| 4,540,061 A | * | 9/1985 | Watanabe | 180/215 |
| 4,566,570 A | * | 1/1986 | Geisthoff | 464/37 |
| 4,681,180 A |   | 7/1987 | Oyama et al. | |
| 4,722,246 A | * | 2/1988 | Gaus et al. | 475/249 |
| 4,733,743 A | * | 3/1988 | Weiss et al. | 180/255 |
| 4,914,980 A | * | 4/1990 | Taureg et al. | 475/89 |
| 5,183,140 A | * | 2/1993 | Nicoll | 192/56.1 |
| 5,208,755 A | * | 5/1993 | Tezuka | 701/88 |
| 5,531,307 A | * | 7/1996 | Fechter et al. | 192/56.4 |
| 5,555,962 A | * | 9/1996 | Hinterlechner | 192/12 R |
| 6,216,841 B1 |  | 4/2001 | Hofer | |
| 6,761,256 B2 | * | 7/2004 | Falk | 192/56.3 |
| 2003/0054889 A1 | * | 3/2003 | Kampf et al. | 464/38 |

FOREIGN PATENT DOCUMENTS

| | | |
|---|---|---|
| AT | 6550 | 12/2003 |
| DE | 35 36 682 A1 | 4/1986 |
| DE | 36 35 406 A1 | 4/1987 |
| DE | 36 32 770 A1 | 3/1988 |

(Continued)

*Primary Examiner*—Paul N Dickson
*Assistant Examiner*—Laura Freedman
(74) *Attorney, Agent, or Firm*—Davis Bujold & Daniels, P.L.L.C.

(57) ABSTRACT

An axle of a vehicle, in particular a commercial vehicle is proposed, in which a change-under-load shifting element is provided between the wheels of the axle, which can be actuated to release the rotationally fixed connection between the wheels.

5 Claims, 1 Drawing Sheet

FOREIGN PATENT DOCUMENTS

| | | |
|---|---|---|
| DE | 38 39 787 A1 | 6/1989 |
| DE | 39 24 520 A1 | 2/1991 |
| DE | 198 54 867 A1 | 6/1999 |
| DE | 43 45 491 C2 | 5/2001 |
| FR | 2 811 270 A1 | 1/2002 |
| GB | 11249 | 5/1913 |
| GB | 2 235 425 A | 6/1991 |
| WO | WO-01/65225 A2 | 9/2001 |

\* cited by examiner

AXLE OF A VEHICLE, ESPECIALLY OF A UTILITY VEHICLE

This application is a national stage completion of PCT/EP2004/004940 filed May 8, 2004 which claims priority from German Application Serial No. 103 25 221.5 filed Jun. 4, 2003.

FIELD OF THE INVENTION

The present invention concerns an axle of a vehicle, in particular a commercial vehicle. In addition, the invention concerns a method for releasing or establishing a connection between the wheels of an axle according to the invention.

It is usual for the axles of vehicles to comprise a differential in order to compensate the rotation speed difference between the two wheels of the axle. Differentials enable different axle and wheel speeds when driving round a curve and ensure a uniform distribution of the drive torques. This avoids slippage of the tires, greater wear and high loading of the drive train. In many applications it is provided that the differential can be locked. For example, in sports cars the driving stability can be increased. In off-road vehicles traction can be ensured or increased in this way. A locking differential is described in the context of DE 38 39 787 C2 by the present applicant.

In many applications it is necessary to provide the locks with very costly change-under-load clutches. This is particularly the case when the locks are to be automatically actuated, for example by an electronic control unit. This results in a costly and elaborate axle structure because besides the differential, change-under-load clutches are also needed, which like the differential itself, must be able to transfer the applied torque.

The purpose of the present invention is to provide an axle of simple structure, which fulfils the function of a locking differential. In addition, it should be possible to manufacture the axle according to the invention inexpensively. Furthermore, a method for releasing or establishing a connection between the wheels of an axle according to the invention should be indicated.

These objectives are achieved for an axle. A method for releasing or establishing a connection between the wheels of an axle according to the invention.

SUMMARY OF THE INVENTION

Accordingly, it is proposed that between the wheels of the axle a change-under-load shifting element is provided, which can be actuated to release the rotationally fixed connection between the said wheels so that the mode of action of a differential with a change-under-load controlled differential lock is achieved. In this way the need for a differential is advantageously avoided.

BRIEF DESCRIPTION OF THE DRAWINGS

The invention will now be described, by way of example, with reference to the accompanying drawings in which.

DETAILED DESCRIPTION OF THE INVENTION

Figure 1:
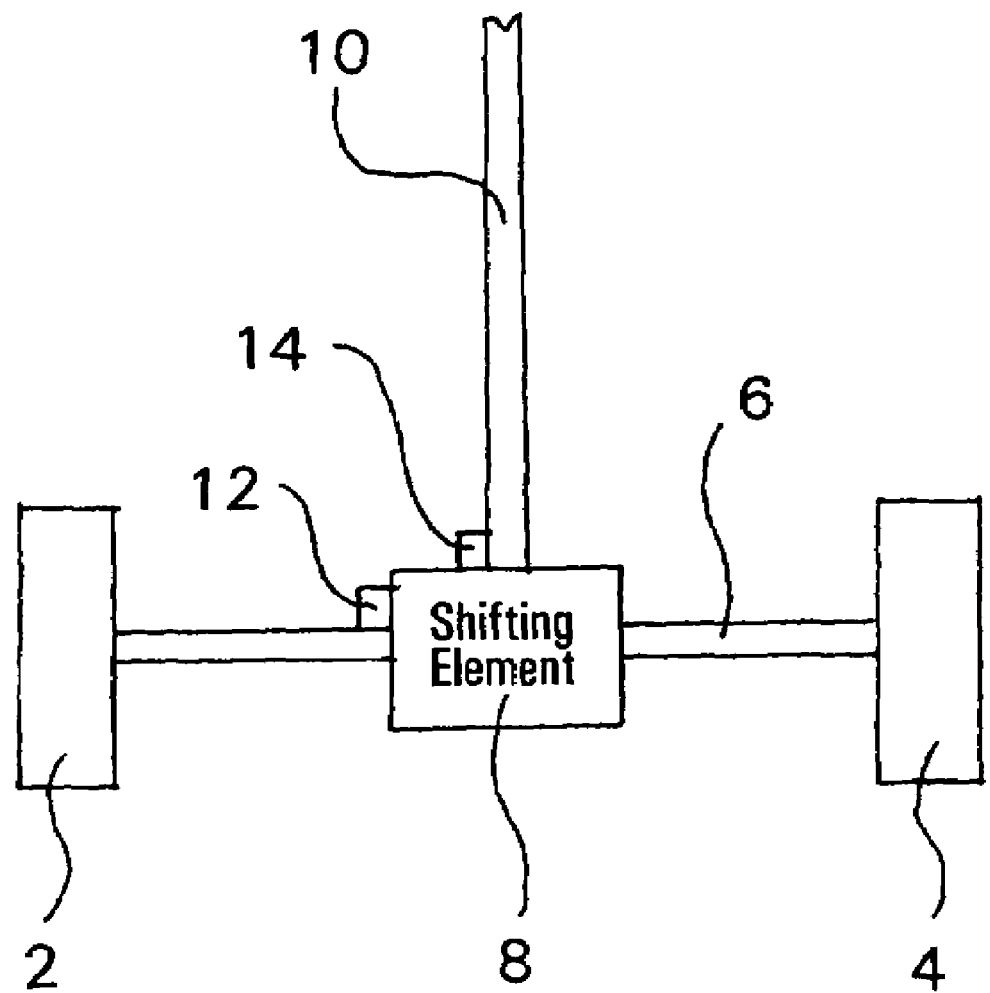
FIG. 1 is a diagrammatic representation of the axle of a vehicle according to the current invention.

For the axle it is still true that the sum of the torques of both wheels 2, 4 corresponds to the input torque of the input shaft 10, which takes into account the fixed ratio of the bevel gears as a constant factor. When both wheels 2, 4 of the axle are in fixed connection with one another via a connection shaft 6, the torque in the said shaft is set such that it consists of the drive torque supplied by the spur bevel gear and an additional component produced by the internal bracing of the two wheels.

According to the invention, the input torque and the torque of the connection shaft 6 connecting the two wheels 2, 4 are measured continuously by suitable means such as torque measurement devices 12, 14, and from the respective drive torque applied a nominal torque can be calculated for the connection shaft 6. When the connection shaft torque is larger than the calculated nominal value, the fixed connection between the two wheels 2, 4 is released by means of a suitable device, preferably a change-under-load shifting element or a clutch 8. This reduces the internal bracing and the torque again approaches its nominal value. When the latter is reached, the wheels 2, 4 are again brought into fixed connection with one another by the change-under-load shifting element 8.

This makes it possible to regulate the torque between the wheels 2, 4 at any time to very near the nominal value, so that the connection shaft 6 according to the invention functions comparably to an axle with a differential and a change-under-load controlled differential lock. The present invention can be used particularly advantageously on commercial vehicles, especially construction machines, since in such vehicles the lock is closed and the wheels are in rotationally fixed connection with one another.

The invention claimed is:

1. An axle of a vehicle with a drive shaft for applying an input torque, with driven wheels and a connection shaft by which the driven wheels are in rotationally fixed connection, and a change-under-load shifting element which can be actuated to release the rotationally fixed connection between the wheels, torque measurement devices are provided, by which the input torque and the torque of the connection shaft are continuously determined, such that from respective applied input torque, a nominal torque for the connection shaft is calculated, and when the torque of the connection shaft exceeds the nominal torque, the change-under-load shifting element is actuated in an opening direction in order to release the rotationally fixed connection between the wheels.

2. The axle of a vehicle according to claim 1, wherein the shifting element previously actuated in the opening direction is actuated in a closing direction when the connection shaft torque corresponds to the nominal torque, in order to bring the wheels into rotationally fixed connection.

3. The axle of a vehicle according to claim 1, wherein the torque of the connection shaft between the wheels is regulated approximately to the nominal torque.

4. A method for releasing or establishing a rotationally fixed connection between wheels of a vehicle, the wheels achieving a rotationally fixed connection via a change-under-load shifting element which can be actuated to release the rotationally fixed connection between the wheels, the method comprising the steps of:

continuously measuring, via torque measuring devices, an input torque of a vehicle drive shaft and a connection shaft torque for the rotationally fixed connection between the wheels;

calculating a nominal torque from the input torque; and comparing the nominal torque with the Connection shaft torque, and when the connection shaft torque exceeds the nominal torque, the actuating the change-under-load shifting element in an opening direction to release the rotationally fixed connection between the wheels, and when the connection shaft torque reaches the nominal torque, the actuating the change-under-load shifting element in a closing direction to establish the rotationally fixed connection between the wheels.

5. A vehicle axle comprising:
a drive shaft for applying an input torque to two driven wheels;
a connection shaft rotationally fixing The two driven wheels to each other;
a change-under-load shifting element, which can release the rotationally fixed connection between the two wheels; and
one or more torque measuring devices to continuously monitor both the input torque from the drive shaft and a torque of the connection shaft, the torque measuring devices calculate a nominal torque for the connection shaft from the applied input torque, when the torque of the connection shaft exceeds the nominal torque, the change-under-load shifting element is opened to release the rotationally fixed connection between the wheels.

* * * * *